(No Model.)

J. H. BINGHAM.
TIRE FOR VEHICLE WHEELS.

No. 466,112. Patented Dec. 29, 1891.

Witnesses:
J. Halpenny
Randall W. Burts

Inventor:
John H. Bingham
By Gialey & Hopkins
His Attorneys.

UNITED STATES PATENT OFFICE.

JOHN H. BINGHAM, OF CHICAGO, ILLINOIS.

TIRE FOR VEHICLE-WHEELS.

SPECIFICATION forming part of Letters Patent No. 466,112, dated December 29, 1891.

Application filed July 13, 1891. Serial No. 399,342. (No model.)

*To all whom it may concern:*

Be it known that I, JOHN H. BINGHAM, a citizen of the United States, residing at Chicago, in the county of Cook and State of Illinois, have invented certain new and useful Improvements in Tires for Vehicle-Wheels, of which the following is a specification.

The tire which forms the subject of the present invention is designed more especially for use on the wheels of velocipedes; but it is equally adapted for use on the wheels of other light vehicles, such as sulkies, light road-carts, children's carriages, &c., and I reserve to myself the right to so apply it. In vehicles of this class it is very desirable that the tire be of such a nature that it will yield to all unevenness in the surface over which it rolls, and thereby relieve the vehicle of the constant jarring to which it would be subjected if the wheels were shod with unyielding tires. There are a number of tires that have been constructed with a view to taking up this jar, and among them a tire consisting of an inflated rubber tube (called the "pneumatic") and a tire consisting of a rubber tube having very thick walls, (called the "cushion-tire.") The pneumatic accomplishes the result more perfectly than any tire at present in use; but it is objectionable because of its necessarily great diameter, which makes it unsightly, and because it is so easily destroyed. The cushion-tire is but little better than the solid rubber tire commonly used, because when completely collapsed by the weight of the rider it becomes in effect nothing more than a solid body of rubber interposed between the rim and the ground.

The object of my present invention is to provide a tire that will accomplish the result aimed at by the inventors of both of these tires; and to this end my said invention consists in a tire formed of a yielding tube having within it a lateral support of resilient material, as particularly pointed out in the claim hereinafter.

Figure 1:
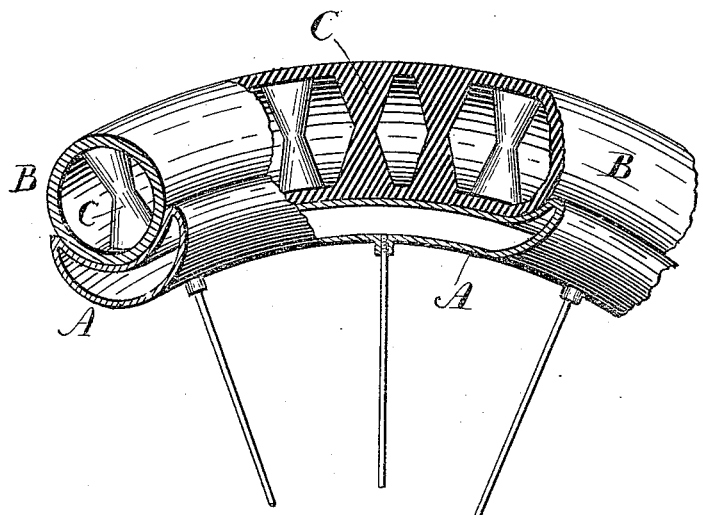
Figure 2:
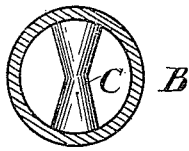

In the accompanying drawings, which are made a part of this specification, Figure 1 is a perspective view of a fragment of a wheel embodying the invention. Fig. 2 is a transverse section of the improved tire.

A represents the rim, and B the tire, which consists of a yielding tube, preferably of rubber, having within it at close intervals a number of resilient lateral supports C extending across it from side to side. These supports may be of square, round, or any other desired shape in cross-section; but I prefer to make them of the double-conical shape shown in the drawings. They are preferably molded integral with the tube, the latter being of course formed with a longitudinal seam. The manner of constructing it is not here specifically described, as it forms no part of the present invention.

What I claim as new, and desire to secure by Letters Patent, is—

As a new article of manufacture, a tire for wheels, consisting of a yielding tube and a number of fixed double-conical supports situated within it at short intervals, substantially as set forth.

JOHN H. BINGHAM.

Witnesses:
L. M. HOPKINS,
J. HALPENNY.